March 20, 1956  E. W. SWENSON  2,738,901
SPREADER

Filed May 5, 1953  3 Sheets-Sheet 1

Inventor
Eskil W. Swenson
By McCanna and Morsbach
Attys.

March 20, 1956  E. W. SWENSON  2,738,901
SPREADER
Filed May 5, 1953  3 Sheets-Sheet 2
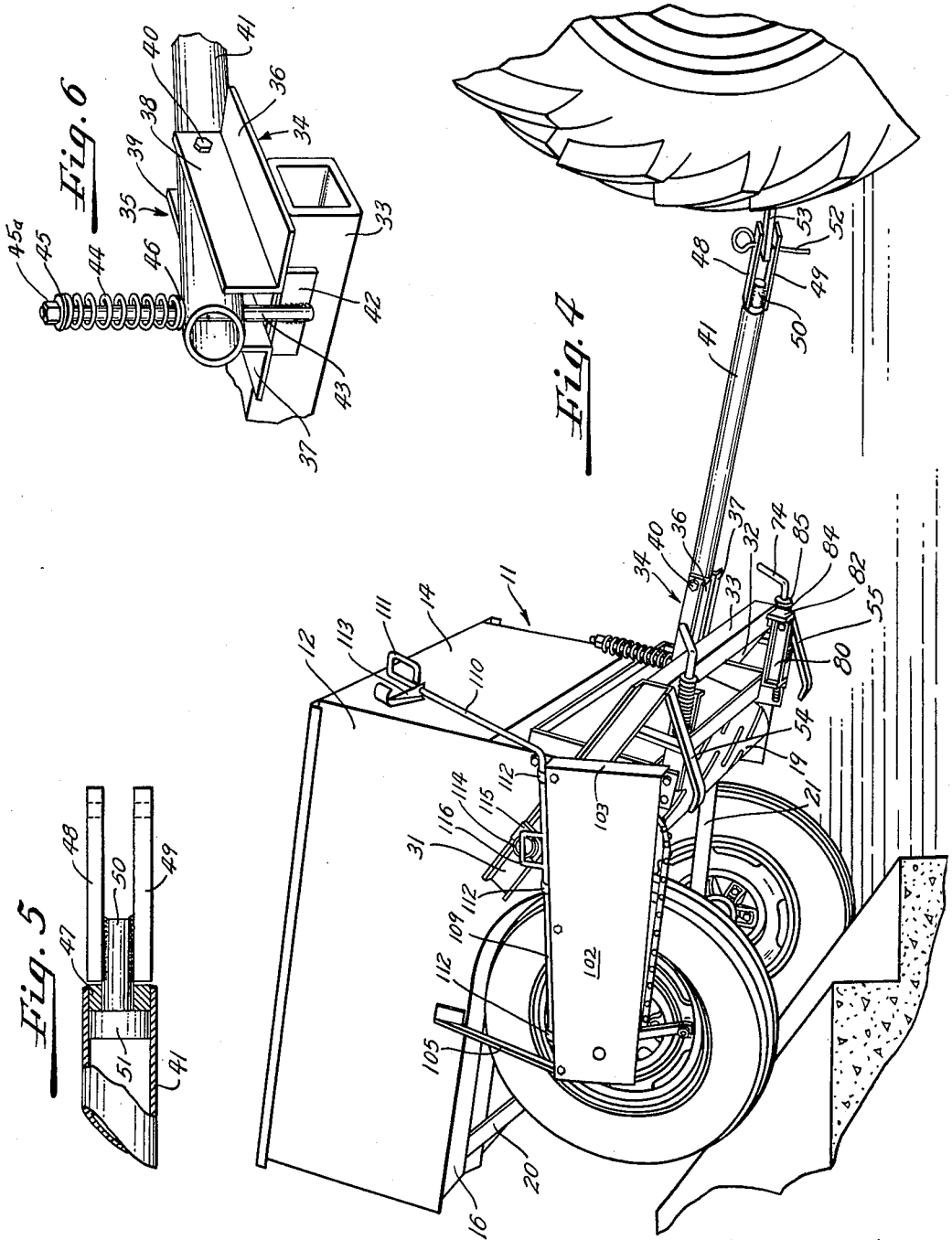
Inventor
Eskil W. Swenson
By McCanna and Morsbach
Attys.

March 20, 1956  E. W. SWENSON  2,738,901
SPREADER
Filed May 5, 1953  3 Sheets-Sheet 3
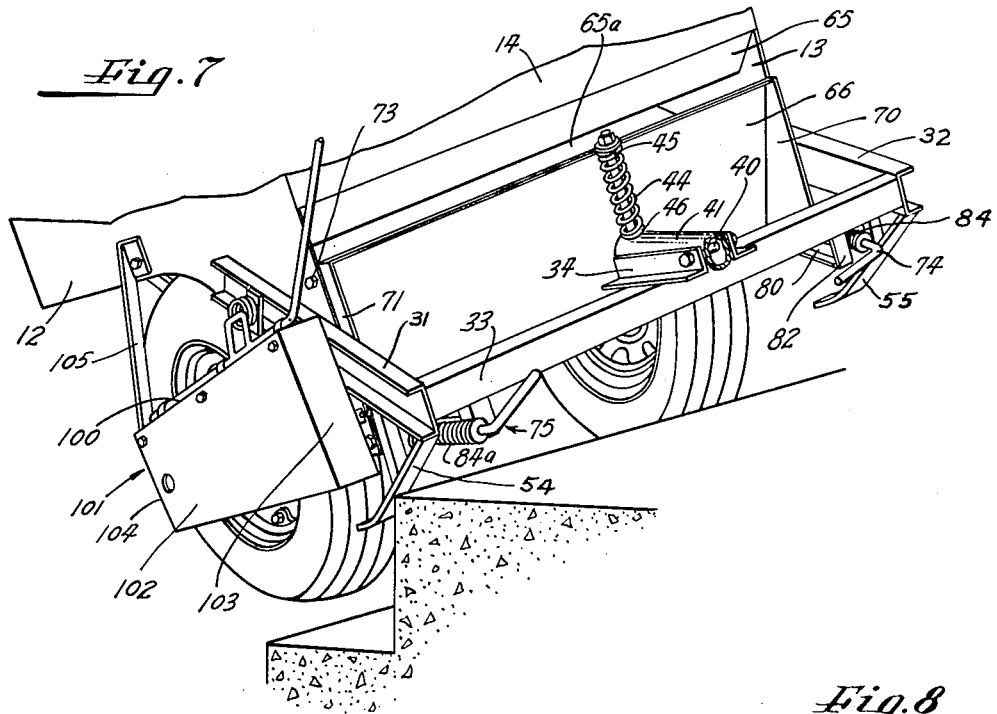
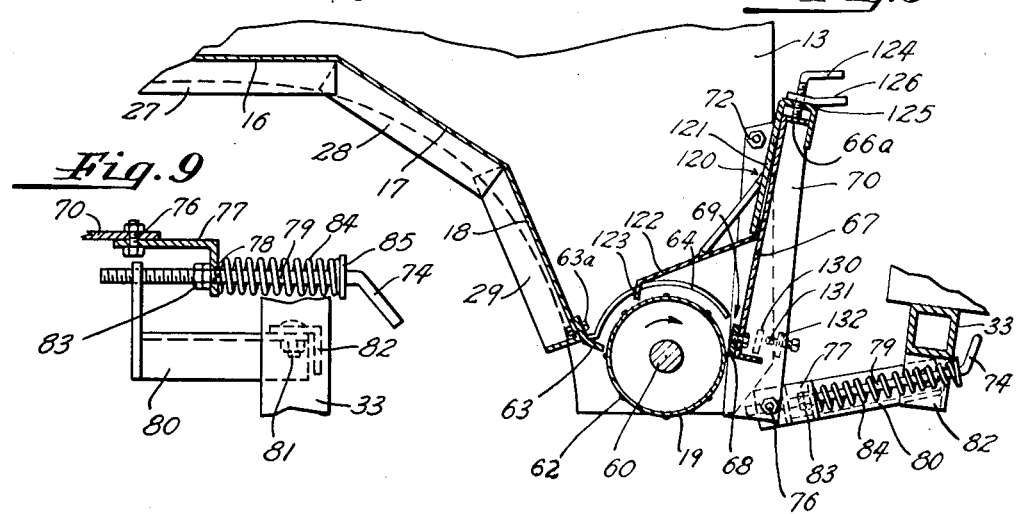
Inventor
Eskil W. Swenson
By McCanna and Morsbach
Attys.

United States Patent Office 2,738,901
Patented Mar. 20, 1956

2,738,901

SPREADER

Eskil W. Swenson, Cherry Valley, Ill.

Application May 5, 1953, Serial No. 353,124

18 Claims. (Cl. 222—177)

This invention relates to a material spreader and in particular to a spreader for spreading sand, salt or other material on sidewalks or steps covered with ice or snow.

It is an object of this invention to provide a material spreader of novel construction which particularly adapts it for traveling up or down steps to spread material thereon, as well as on sidewalks.

Another object of this invention is to provide a material spreader in the form of a wheeled cart having a novel arrangement at its front end for connecting it to a towing vehicle which facilitates turning of the cart and minimizes the possibility of tipping over of the cart as it moves up or down steps.

It is also an object of this invention to provide a novel material spreader in which the working parts of the feed mechanism of the spreader are protected against damage while going up or down steps.

A further object of this invention is to provide a novel material spreader having an improved feeding action and in which bridging of the material in the spreader is avoided, thereby insuring an uninterrupted feed of material from the spreader.

A further object of this invention is to provide a novel material spreader constructed to permit the operator to have ready access to the feed mechanism of the spreader for removing obstructions therefrom without the necessity of first emptying the material from the spreader.

A still further object of this invention is to provide a spreader of novel construction in which a feed roll and a feed gate coact to define a feed opening through which material is discharged from the spreader, and in which the feed gate is readily adjustable to vary the size of the feed opening for selectively controlling the rate of feed of material from the spreader.

Another object of this invention is to provide a novel spreader in which there is provided a manually operable lever for operating a clutch in the drive to the feed mechanism which is accessible at the front of the spreader.

A still further object of this invention is to provide a spreader in the form of a wheeled cart having a hopper for holding the material to be spread which is substantially balanced front-to-back on the wheels.

A specific object of this invention is to provide a novel arrangement in a spreader which especially adapts the spreader for spreading salt at a preselected rate of feed.

Other and further objects and advantages of the invention will be apparent from the following description of a preferred embodiment thereof, which is illustrated in the accompanying drawings.

In the drawings:

Figure 4 is a perspective view of the Fig. 1 spreader as it is being towed down steps;

Figure 5 is a fragmentary section showing a portion of the attachment for connecting the spreader to the towing vehicle;

Figure 6 is a fragmentary perspective view showing another portion of this attachment;

Figure 7 is a perspective view of the Fig. 1 spreader as it is being pulled up steps;

Figure 1:
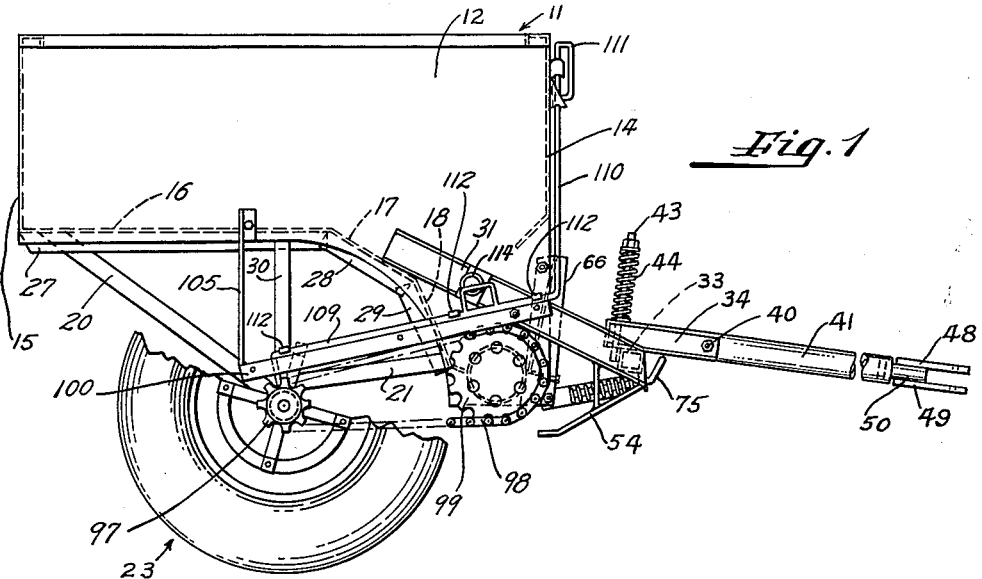
Figure 1 is an end view, with parts broken away, of a material spreader embodying the principles of the present invention.

Figure 8 is a transverse section through the lower front end of the spreader showing the feed mechanism thereat for discharging material from the spreader and also showing the mounting of the auxiliary feed plate for use when salt is the material being spread; and Figure 9 is a sectional view of details of the mechanism for adjusting the feed gate to selectively control the size of the discharge opening of the spreader.

Referring to the drawings, the spreader of the present invention comprises a wheeled cart having a hopper for carrying sand, salt, or other material to be spread, a feed roll for automatically feeding sand from the hopper in response to movement of the wheeled cart, and means for attaching the wheeled cart to a vehicle for pulling it, such as a tractor. The hopper 11 is in the form of a box-like structure having spaced vertical sides 12 and 13, a vertical front wall 14, a back wall 15, and a bottom (Fig. 8) comprising a horizontal rear portion 16, a downwardly and forwardly inclined intermediate portion 17, and a more steeply inclined forward portion 18. The hopper 11 is open at the top and at its front end has a bottom opening in which the feed roll 19 operates to discharge the material from the hopper, as described in detail hereinafter.

Figure 3:
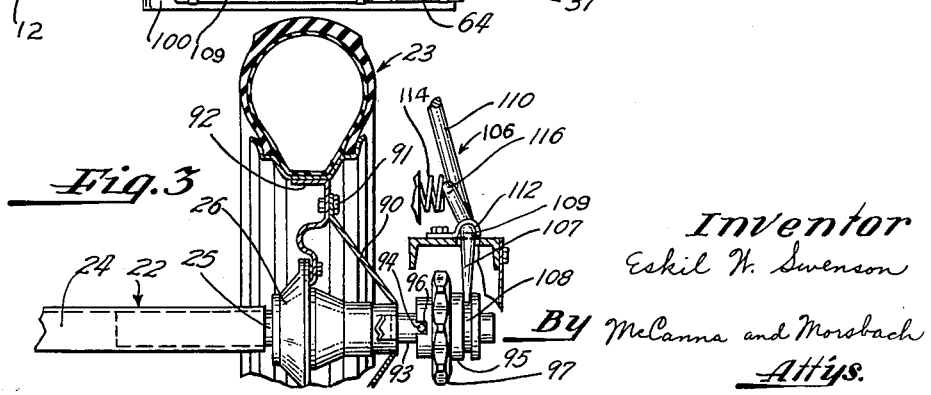
Figure 3 is a section through the Fig. 1 spreader at one wheel thereof showing details of the device from this wheel to the feed roll of the spreader.

For supporting the hopper 11 there is provided a rigid undercarriage including spaced pairs of braces 20 and 21 extending from the bottom wall of the hopper adjacent the back and front thereof, respectively, and downwardly to a location below the middle of the hopper, where they are connected to the stationary axle assembly 22 for the wheels 23 of the cart. As best seen in Fig. 3, the stationary axle assembly 22 includes a rigid, horizontal U-shaped member 24 which at its respective outer ends receives solid rods 25, which are welded to the U-shaped member 24. The hub 26 of each wheel 23 is mounted rotatably on the respective outer end of the outer rod 25 of the stationary axle assembly 22, so that the axle assembly 22 remains stationary while the wheels 23 turn as the cart is pulled. The undercarriage for the hopper also includes spaced pairs of support plates 27, 28, and 29 welded to the respective bottom wall portions 16, 17 and 18 (Figs. 1 and 8), the upper ends of the respective braces 20 and 21 being welded to the plates 27 and 29, respectively. Also, at the middle of the hopper there are provided a pair of spaced braces 30 (Fig. 1) which at their lower ends are welded to the stationary axle assembly 22 and at their upper ends are welded to the support plates 27. Cross braces (not shown) interconnecting the braces 30 complete the assembly of the rigid undercarriage for the hopper 11.

It is to be noted especially that the hopper extends to the rear of the wheels, as well as at the front of the wheels. With this construction, the weight of the hopper is substantially balanced front-to-back on the wheels, which facilitates towing of the vehicle in the desired manner.

At the front of the hopper there are provided channel irons 31 and 32, which are welded respectively to the sides 12 and 13 of the hopper and which project forward and downward beyond the front wall 14 of the hopper. At their forward ends the channel irons 31 and 32 are interconnected by a rigid hollow cross bar 33. At the middle of the cross bar 33 there are provided a pair of spaced, forwardly extending angle irons 34 and 35 which have their bottom legs 36 and 37, respectively, welded to the top of the cross bar 33, as best seen in Fig. 6. The angle irons 34 and 35 also present upwardly extending legs 38 and 39, respectively, which are in spaced parallel relation. A cross pin 40 extends between the upper legs of the angle irons 34 and 35 beyond the front of the cross bar 33 and provides a pivotal mounting for the elongated hollow rod 41, by means of which the cart is attached to a pulling vehicle, such as a tractor. At the back side of the cross bar 33 a separate plate 42 rigidly supports an upwardly extending stem 43 which extends snugly but slidably through the rod 41 transversely thereof at its rear end. A compression coil spring 44 is retained between a collar 45 carried on the upper end of the stem 43 and a loose lower collar 46 bearing against the upper side of the elongated rod 41. A nut 45a is threaded onto the upper end of stem 43 to retain collar 45 in place. Spring 44 acts against the elongated rod 41 to normally position it to extend in alignment with the angle irons 34 and 35 (Fig. 1) and permits it to pivot about the cross pin 40, as shown in Fig. 6. The plate 42 abuts against the undersides of the horizontal arms 36 and 37 of the respective angle irons 34 and 35 when rod 41 is in its normal, horizontal position, but is capable of sliding movement downward across the rear face of the cross bar 33.

The elongated rod 41 at its opposite end is closed by an annular end plug 47 (Fig. 5), which is welded to this end of the rod. At this end of the rod 41 there is provided a swivel clevis, comprising spaced, parallel, upper and lower plates 48 and 49 and a stem 50 welded to these plates and extending through the plug 47. The stem 50 carries an enlarged head 51 disposed within rod 41 and abutting against the plug 47, which prevents the swivel clevis from becoming detached from this end of rod 41. A removable cross pin 52 (Fig. 4) extends down through aligned holes in the clevis plates 48 and 49 and a tow bar 53 which extends between the plates 48 and 49 and which extends from the pulling vehicle.

With the foregoing construction, the pin 52 defines a substantially vertical pivot about which the rod 41 and the cart 11 may swing laterally as a unit during use, the attachment of the swivel clevis 48—51 and the rod 41 permit the rod 41 and cart 11 to turn about the longitudinal axis of rod 41, and the pin 40 defines a substantially horizontal pivot about which the cart 11 may move with respect to the elongated rod 41.

The foregoing construction enables the cart of the present invention to turn easily and to be drawn up and down steps for spreading material thereon, as well as on sidewalks. This is of particular advantage in localities where the outside steps of public buildings are exposed to ice and snow and present an even more serious hazard than ice or snow-covered sidewalks. As the cart is towed up or down the steps it quite often happens that one wheel of the cart is ahead of the other, so as to be on the next higher or lower step, as the case may be. With the foregoing construction, the cart 11 and rod 41 can turn as a unit about the connection of the rod 41 to the swivel clevis 48—51, so that the cart 11 tilts in the manner shown in Fig. 4 without danger of tipping over.

To prevent the cart from getting caught on the steps as it is pulled up the steps, especially if it tilts to one side or the other while going up the steps, there are provided skid plates 54 and 55, which are welded to the undersides of the channel irons 31 and 32, respectively, at their front ends, and which extend downward and rearward at an acute angle with respect thereto. As best seen in Fig. 7, if the cart tilts and one wheel advances onto the next higher step ahead of the other wheel of the cart, the skid plate in front of the trailing wheel engages the front edge of that step and slides up over that step, thereby insuring that the underside of the front of the cart or the trailing wheel on the cart does not become caught on that step due to the tilt of the cart. In addition, these skid plates protect the feed roll, the drive mechanism for the feed roll, and the other parts at the lower front end of the spreader from bumping into steps or other obstructions during use.

Figure 2:
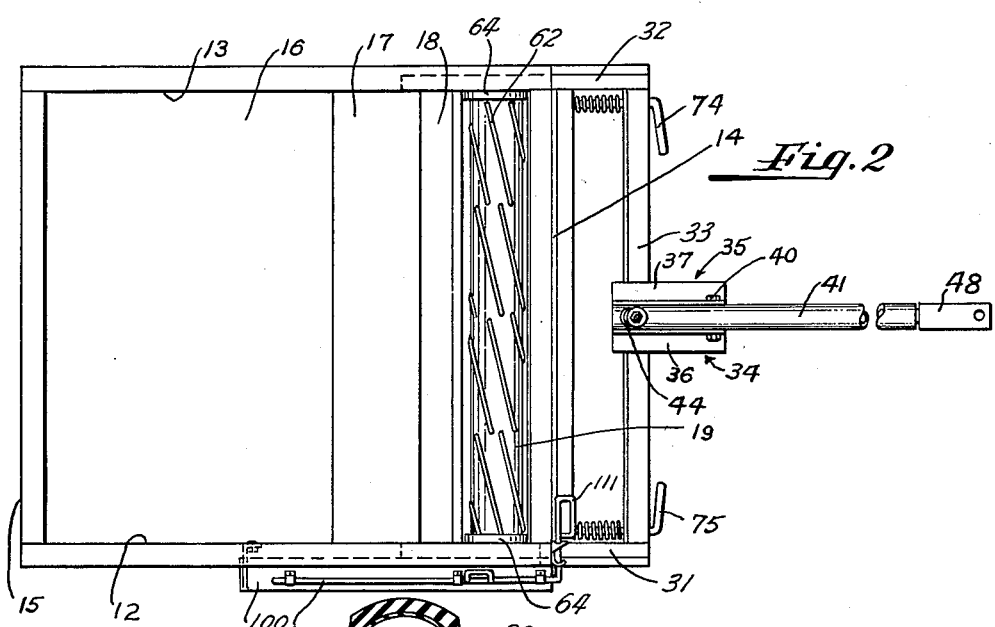
Figure 2 is a top view of the Fig. 1 spreader.

As best seen in Fig. 8, the feed roll 19 is mounted on an axle 60 which is suitably supported for rotation by the side walls 12 and 13 of the hopper at the lower front end of the hopper. External helical ribs 62 are arranged in staggered relation along the length of the feed roll 19, as best seen in Fig. 2. The lower end of the forward portion 18 of the hopper bottom carries an adjustable lip 63, which is suitably adjustably mounted by screw 63a to have its lower edge terminate just short of the periphery of the feed roll 19. An arcuate sand shield 64 is supported at each side wall of the hopper extending across the top of the respective end of the feed roll 19 to prevent the spreading material from passing down around the ends of the feed roll.

The front wall 14 of the hopper terminates in an inwardly extending lower lip 65 well above the feed roll 19. A feed gate 66 is pivotally mounted to extend between the sides of the hopper directly below the front wall 14 of the hopper. As best seen in Fig. 8, the front wall 67 of the feed gate, which extends across the lower front end of the hopper, carrier a wear plate 68 at its back side which extends adjacent the front of the feed roll 19 to define therewith a downwardly extending opening 69 between the sand shield 64 for passing sand down between the feed roll 19 and the wear plate 68.

Obviously, the rate at which sand is fed from the hopper 11 depends upon the spacing between the wear plate 68 and the feed roll 19. This may be selectively adjusted by the user of the spreader by adjusting the feed gate 66 angularly. The feed gate 66 includes spaced sides 70 and 71 which are pivotally mounted on aligned pivot bolts 72 and 73, respectively, adjacent their upper ends to the respective side walls 13 and 12 of the hopper. For adjusting the feed gate 66 angularly about its pivotal mounting there are provided the adjustable feed gate cranks 74 and 75, shown in Figs. 7–9.

Referring to Figs. 8 and 9, the side plate 70 of the feed gate at its lower front end carries a bolt 76 by means of which it is pivotally connected to longitudinally shiftable L-shaped member 77. The L-shaped member 77 is apertured at 78 to freely pass the elongated stem 79 of the crank 74. The crank stem 79 is threaded at its inner end and is threadedly received thereat in a stationary bracket 80, which is bolted at 81 to an upwardly extending angle iron 82 welded to the underside of the cross bar 33. The crank stem 79 carries a lock nut assembly 83 abutting against one side of the L-shaped member 77 at the aperture 78 therein. A coil spring 84 is under compression between the opposite side of the L-shaped member 77 at the aperture 78 therein and a collar 85 carried on the outer end of the crank stem 79. This construction causes the L-shaped member 77 to be shifted longitudinally in unison with the crank 74 as the crank is turned and moves axially relative to its stationary mounting bracket 80. This movement of the L-shaped member 77, through its pivotal connection at 76 to the side wall 70 of the feed plate 66 causes the feed plate to be shifted angularly about its pivot at 72. The arrangement at crank 75 at the opposite side of the feed plate is identical to that of crank 74, just described.

With the foregoing construction, the feed gate 66 may be adjusted selectively through the manual cranks 74 and 75 to obtain the desired rate of feed from the hopper.

While the force of the spring 84 at crank 74 and the corresponding spring 84a at the other crank 75 is normally sufficient to maintain the feed gate 66 in the position to which it has been adjusted, still this spring bias may be overcome when oversized particles or other obstructions pass down through the feed opening 69 between the feed roll 19 and the feed gate. In this event, the feed gate 66 pivots about its pivot pins 72 and 73 against the force of the springs 84 and 84a, thereby moving away from the feed roll 19 and permitting the oversized particles to pass down through the feed opening. For limiting this outward movement of the feed gate 66 away from the feed roll 19 there is provided a stop mechanism (Fig. 8) which includes a plate 130 mounted rigidly on the feed gate and extending in front of the lower end of the front wall 67 of the feed gate, and a threaded bolt 131 threadedly adjustable through a plate 132 rigidly attached to the hopper. When the feed gate moves outward away from the feed roll 19 the plate 130 abuts against the stop bolt 131 and the outward movement of the feed gate is thereby limited.

It will be noted that in the foregoing construction the front wall 14 of the hopper extends substantially vertical above the feed roll during most occasions of normal use of the device. This is of particular advantage since it avoids "bridging" of the material in the hopper and thereby insures a continuous feed of material downward past the feed roll.

Also, it will be noted that the top of the feed gate 66 terminates in spaced relation below the lip 65 on the front wall 14 and defines therewith an opening 65a leading into the hopper directly above the feed roll. This opening enables the operator of the spreader to get his hands into the hopper to remove obstructions from adjacent the feed roll, or to otherwise assist in feeding material down through the feed opening, without the necessity of emptying all of the spreading material from the hopper before doing so. Also this opening facilitates visual observation of the feed opening at 69 when the feed gate 66 is initially being adjusted before the hopper is filled with spreading material.

When salt is used as the spreading material it has been found desirable to use an auxiliary feed plate in association with the feed roll to control the rate of feed. This auxiliary feed plate is indicated generally at 120 in Fig. 8 and includes a downwardly extending segment 121 shaped to extend down along the back face of the wall 67 of the feed gate 66 in contiguous relation therewith, a transverse baffle portion 122 overlying the front of the feed roll 19, and a downwardly extending lip 123 depending from the rear of the baffle portion 122 and terminating just above the feed roll 19. At its upper end the auxiliary feed plate 120 is channel shaped to extend snugly on opposite sides of the feed plate 66 at the latter's upper end. Threaded crank members extend threadedly down through the top wall 125 of the feed plate and at their lower ends abut against the top wall 66a of the feed plate. Thus, by turning the cranks 124 the spacing between the lower lip 123 on the auxiliary feed plate and the feed roll 19 may be adjusted. Lock nuts 126 are provided for locking the cranks 124 in the respective positions to which they have been adjusted.

In the operation of the auxiliary feed plate with the rest of the feed mechanism, the baffle portion 122 of this auxiliary feed plate causes the salt in the hopper to be deflected down toward the rear of the feed roll. As the feed roll 19 rotates in the direction indicated by the arrow in Fig. 8, it carries this salt around to the feed opening 69, the spacing between the feed roll and the lip 123 on the auxiliary feed plate determining the rate at which salt is fed to the discharge opening.

The rotary feed roll 19 is driven from the ground wheels of the cart, so that material is fed from the hopper in response to the travel of the cart. This drive includes a spider assembly 90 (Fig. 3) bolted at 91 to a wheel 92 of the cart so as to rotate in unison therewith. The spider assembly 90 includes a stub shaft 93 projecting outward beyond the wheel and carrying a shear pin 94. A clutch member 95 is slidably mounted on the stub shaft 93 and is formed at its inner axial end with a recess 96 for snugly receiving the shear pin 94. The clutch member 95 carries a sprocket 97 which through a chain 98 (Fig. 1) drives a sprocket 99 suitably connected to the feed roll 19 so that they rotate in unison. When the shiftable clutch member 95 is in its innermost position, as shown in Fig. 3, it is driven through the shear pin 94 from the spider assembly 90 attached to the wheel, so that the feed roll 19 is driven from the wheel through the above-described chain drive.

The chain 98 is substantially enclosed by a chain guard which consists of a channel-shaped top member 100 (Fig. 1) and a three-sided box-like member 101 presenting a depending side wall 102 and end walls 103 and 104. The chain guard members 100 and 101 are bolted together and define an enclosure which is open only at the bottom and at the inner side, next to the cart. The top member 100 of the chain guard is connected at its rear end to the adjacent side wall 12 of the hopper by a rigid brace 105 and adjacent its front end is bolted to the adjacent channel iron 31.

For selectively disconnecting the drive from the ground wheel to the feed roll 19, there is provided the clutch shift lever 106. This shift lever includes a depending finger 107 which is received in a cut-away groove 108 in the clutch member 95, an intermediate arm 109 which extends along the top of the chain guard, and an upwardly extending arm 110 at the front of the hopper which terminates in an operating handle 111. Keepers 112 are mounted at spaced intervals along the top of the chain guard and enable the shift lever to be turned about an axis defined by its intermediate portion 109 for selectively shifting the clutch member 95 into or out of driving relation with the stub shaft 93 on which it is mounted. At the front wall 14 of the hopper there is provided a stop 113 for limiting movement of the clutch lever in the clutch-engaging direction and for normally retaining the clutch lever in this position. A compression coil spring 114 mounted on a plate 115 attached to the angle iron 31 engages a handle 116 on the intermediate portion of the clutch lever to bias the clutch lever (counterclockwise in Fig. 4) to its clutch-engaging position, so that when the handle 111 is released the spring 114 automatically returns the clutch lever to its clutch-engaging position.

Normally the clutch lever 106 is in the clutch-engaging position shown in Figs. 3 and 4, so that the feed roll 19 is driven from the ground wheel as the cart travels over the surface being spread. If for any reason the operator wishes to stop the feed of material from the spreader he simply pulls the shift lever down away from the stop 113 to thereby disconnect the drive to the feed roll. When the operator releases the shift lever 106 it automatically returns to its clutch-engaging position.

While in the foregoing description and the accompanying drawings there is disclosed a specific preferred embodiment of the present invention, it is to be understood that various modifications, omissions and refinements departing from the specific disclosed embodiment of the invention may be resorted to without departing from the spirit and scope of my present invention.

I claim:

1. A material spreader comprising a hopper for containing material, means supporting said hopper for travel, a rotary feed roll located at the lower end of said hopper for discharging material therefrom, an upwardly extending feed gate located at one side of said feed roll and defining therewith a feed opening through which material is discharged from the hopper, means mounting said feed gate for pivotal adjustment about an axis parallel to the axis of the feed roll toward and away from the feed roll, manual crank means opperatively interconnected with said feed gate for positively adjusting the position of the feed gate away from said roll, and spring means acting against said feed gate for yieldably urging the feed gate toward the roll to normally maintain the feed gate in the position to which it has been adjusted and permitting movement of the feed gate about its pivotal mounting against the force of said spring means when oversized particles are located at the feed opening between the feed roll and the feed gate.

2. The spreader of claim 1 wherein there is additionally provided an auxiliary feed plate overlying said feed roll to deflect the material in the hopper to the opposite side of the feed roll from said feed opening, said feed plate having a depending lip in spaced relation from said opening and terminating adjacent said feed roll to define therewith a material passage for passing material to said feed opening, and means for adjustably mounting said feed plate on said feed gate to permit the selective adjustment of said lip with respect to said feed roll.

3. A material spreader comprising a hopper for containing material, means supporting said hopper for travel, feed mechanism associated with said hopper for discharging the material therefrom, said hopper having an end wall at one side of said feed mechanism and extending upward therefrom, means defining an opening in said end wall below the upper end of said feed mechanism spaced above said feed mechanism and below the upper end of the hopper permitting ready access to the interior of the hopper at said feed mechanism while the hopper contains material above the level of said feed mechanism, and a lip on said end wall extending inwardly and downwardly in said hopper from the upper edge of said opening for deflecting the material in said hopper away from said opening.

4. A material spreader comprising a hopper for containing material, means supporting said hopper for travel, a feed roll at the lower front end of said hopper for discharging the material therefrom, said hopper having a front end wall which terminates at its lower end in spaced relation above said feed roll, an adjustable feed gate located at the front side of said feed roll and defining therewith an opening through which material is discharged from the hopper, said feed gate being located below said front wall of the hopper and terminating at its upper end in spaced relation below the lower end of said front wall and defining therewith an access opening enabling the operator to have ready access to the interior of the hopper at said feed roll therein while the hopper contains material above the level of the feed roll, and a lip on the lower end of said front wall extending inwardly and downwardly in said hopper for deflecting the material therein away from said opening.

5. A material spreader comprising a hopper for containing material, means supporting said hopper for travel, a horizontal cross bar rigidly connected to said hopper and positioned at the front of the hopper, an elongated rod extending forward from said cross bar, means pivotally mounting said elongated rod on said cross bar and defining a horizontal pivot for said elongated rod enabling the horizontal rod to pivot vertically about said cross bar, spring means acting against said elongated rod to bias it to horizontal position, and connection means rotatably mounted on the forward end of said elongated rod for attachment of said rod to a towing vehicle and permitting said rod to turn about its own axis relative to said connection means.

6. A material spreader comprising a hopper for containing material, means supporting said hopper for travel, a horizontal cross bar rigidly connected to said hopper and positioned at the front of the hopper, spaced angle irons rigidly mounted on said cross bar and extending forward therefrom in parallel relation, and elongated rod extending between said angle irons and forward therefrom, a cross pin extending between said angle irons at the respective forward ends thereof and extending through said elongated rod thereat and defining a pivot about which said elongated rod can move vertically, spring means at the rear end of said elongated rod biasing the elongated rod to a horizontal position with its rear portion disposed between said angle irons, and connection means connected in swivel fashion to the forward end of said elongated rod for attaching said rod to a towing vehicle and permitting said rod to turn about its own axis relative to said connection means.

7. A material spreader comprising a hopper for containing material, a pair of wheels at opposite sides of the hopper for supporting the hopper for travel, a horizontal cross bar rigidly connected to said hopper and positioned at the front of the hopper, an elongated rod extending forward from said cross bar, means pivotally mounting said elongated rod on said cross bar and defining a horizontal pivot for said elongated rod enabling the horizontal rod to pivot vertically about said cross bar, spring means acting against said elongated rod to bias it to a horizontal position, connection means rotatably mounted on the forward end of said elongated rod for attachment of said rod to a towing vehicle and permitting said rod to turn about its own axis relative to said connection means, and a pair of skid plates mounted on the hopper, said skid plates being located in front of said wheels and inclining downwardly and rearwardly toward said wheels.

8. A material spreader comprising a hopper for containing material, a pair of ground wheels at opposite sides of the hopper for supporting the hopper for travel, a feed roll at the lower front end of said hopper for discharging the material therefrom, said feed roll having its underside exposed at the bottom of the hopper, said hopper having a front end wall which terminates at its lower end in spaced relation above said feed roll, an adjustable feed gate located at the front side of said feed roll and defining therewith an opening through which material is discharged from the hopper, said feed gate being located below said front wall of the hopper and terminating at its upper end in spaced relation below the lower end of said front wall and defining therewith an opening enabling the operator to have ready access to the interior of the hopper at said feed roll therein while the hopper contains material above the level of the feed roll, means at the front of the hopper for attaching the hopper to a towing vehicle, and a pair of skid plates mounted on said hopper and positioned in front of the lower front end of the hopper for protecting the exposed feed mechanism, said skid plates being located in front of said wheels and inclining downwardly and rearwardly toward said wheels.

9. The spreader of claim 8, wherein there is additionally provided a drive mechanism extending between one of said ground wheels and said feed roll for driving the feed roll in response to turning of said ground wheel, a clutch controlling the connection of said drive mechanism to the feed roll, a shiftable clutch lever controlling the operation of said clutch and terminating in a handle located at the front of the hopper, a stop mounted on the front of the hopper for engaging said clutch lever and limiting movement of the clutch lever in the clutch-engaging direction, and spring means acting against said clutch lever to bias the clutch lever to the clutch-engaging position.

10. The spreader of claim 9, wherein there is further provided a horizontal cross bar rigidly connected to said hopper and positioned at the front of the hopper, spaced angle irons rigidly mounted on said cross bar and extending forward therefrom in parallel relation, an elongated rod extending between said angle irons and forward therefrom, a horizontal cross pin extending between said angle irons at the respective forward ends thereof and extending through said elongated rod thereat and defining a pivot about which said elongated rod can move vertically, spring means at the rear end of said elongated rod biasing the elongated rod to horizontal position with its rear portion disposed between said angle irons, and connection means connected in swivel fashion to the forward end of said elongated rod for attaching said rod to a towing vehicle and permitting said rod to turn about its own axis relative to said connection means.

11. A material spreader comprising a hopper for containing material, means supporting said hopper for travel, feed mechanism associated with said hopper for discharging the material therefrom, said feed mechanism being located to the rear of the front wall of said hopper, means defining an opening in the front wall of the hopper permitting the operator to have ready access to the interior of the hopper at said feed mechanism while the hopper contains material above the level of said feed mechanism, said last mentioned means including a lip on said front wall above the opening extending downwardly and inwardly into the hopper to prevent material from flowing out through said opening, a drive mechanism for driving said feed mechanism, a clutch in said drive mechanism for controlling the drive to said feed mechanism, and a shift lever controlling the operation of said clutch accessible at the front of the hopper.

12. A material spreader comprising a hopper having a front wall and a bottom wall, a pair of ground wheels at opposite sides of the hopper for supporting the hopper for travel, the bottom wall of said hopper extending substantially horizontally from a point above the axis of said wheels rearwardly to the rear end of said hopper and extending forwardly and downwardly from said point above the axis of said wheels toward the front end of said hopper and terminating in spaced relation to said front wall, and a feed mechanism disposed in said hopper between the front wall and the forward end of said bottom wall for discharging material from said hopper.

13. A material spreader comprising a hopper having a front wall, a bottom wall and side walls, a pair of ground engaging wheels, means mounting said ground engaging wheels on said hopper between said side walls and below said bottom wall, said ground wheels being disposed intermediate the forward and rear ends of said hopper, said bottom wall having a substantially horizontally extending rear portion disposed above said ground wheels and a forward position extending forwardly and downwardly about the periphery of said wheels to a point forwardly of said wheels and spaced rearwardly from said front wall, and a feed mechanism disposed in said hopper forwardly of said wheels and between said front wall and the forward edge of said bottom wall for discharging material from said hopper.

14. A material spreader comprising a hopper for containing material, means supporting said hopper for travel, a rotary feed roll located at the lower end of said hopper for discharging material therefrom, an adjustable feed gate located at one side of said feed roll and extending upwardly therefrom and defining therewith a discharge opening through which material is discharged from the hopper, means for adjusting the position of the feed gate toward and away from the periphery of the feed roll for selectively varying the size of said discharge opening, an auxiliary feed control plate mounted to overlie said feed roll to deflect the material in the hopper to the opposite side of the feed roll from the discharge opening, said feed plate having a depending lip spaced circumferentially about the feed roll from said discharge opening and terminating in spaced relation to the feed roll to define a material passage for passing material to said discharge opening, and means for adjustably mounting said feed plate to permit the selective adjustment of the spacing of said lip from said feed roll.

15. A material spreader comprising a hopper for containing material, means supporting said hopper for travel, a rotary feed roll located at the lower end of said hopper for discharging material therefrom, an adjustable feed gate located at one side of said feed roll and extending upwardly therefrom and defining therewith a discharge opening through which material is discharged from the hopper, means for adjusting the position of the feed gate toward and away from the periphery of the feed roll for selectively varying the size of said discharge opening, an auxiliary feed control plate, and means mounting said plate on said feed gate for adjustment thereon toward and away from the feed roller, said feed plate extending from said gate over the top of said roller and having the lower edge thereof spaced from the periphery of said roller at the side of the vertical centerline through the roller opposite said discharge opening.

16. A material spreader comprising a hopper for containing material, means supporting said hopper for travel, a feed roll at the lower front end of said hopper for discharging the material therefrom, said hopper having a front end wall which terminates at its lower end in spaced relation above said feed roll, an adjustable feed gate located at the front side of said feed roll and defining therewith an opening through which material is discharged from the hopper, said feed gate being located below said front wall of the hopper and terminating at its upper end in spaced relation below the lower end of said front wall and defining therewith an access opening enabling the operator to have ready access to the interior of the hopper at said feed roll therein while the hopper contains material above the level of the feed roll, a lip on the lower end of said front wall extending inwardly and downwardly in said hopper for deflecting the material therein away from said opening, an auxiliary feed control plate, means for slidably mounting said feed control plate on said gate for movement in a direction parallel to said feed gate and transversely of said feed roll, said feed plate extending below said access opening over the top of the feed roll, the lower edge of said feed roll extending closely adjacent the periphery of said roll rearwardly of the vertical centerline through said roll, and means engageable with said gate for adjusting the position of the feed plate relative thereto to vary the spacing between the lower edge of the feed plate and the roll.

17. A material spreader comprising a hopper for containing material, a pair of wheels at opposite sides of the hopper for supporting the hopper for travel, a pair of skid plates rigidly mounted on the forward end of said hopper, said skid plates being located in front of said wheels and inclining downwardly and rearwardly toward said wheels, an elongated draft member for attaching the spreader to a towing vehicle, means attaching said draft member to said hopper for vertical pivotal movement relative thereto about an axis located adjacent said skid plates, stop means engageable with said draft member for limiting vertical swinging movement of the draft member above a preselected position in which the draft member extends forwardly of said hopper, and spring means yieldably engaging the draft member to normally urge the latter against said stop means and yieldable to permit the hopper to swing downwardly relative to said draft member about said attaching means when said skid bars strike an abutment.

18. A material spreader comprising a hopper for containing material, a pair of wheels at opposite sides of the hopper for supporting the hopper for travel, a pair of skid plates rigidly mounted on the forward end of said hopper, said skid plates being located in front of said wheels and inclining downwardly and rearwardly toward said wheels, an elongated draft member for attaching the spreader to a towing vehicle, means attaching said draft member to said hopper for vertical pivotal movement relative thereto about an axis located adjacent said skid plates, stop means engageable with said draft member for limiting vertical swinging movement of the draft member above a preselected position in which the draft member extends forwardly of said hopper, spring means yieldably engaging the draft member to normally urge the latter against said stop means and yieldable to permit the hopper to swing downwardly relative to said draft member about said attaching means when said skid bars strike an abutment, feed mechanism for said hopper located at the lower front end of said hopper in front of said wheels, and means operatively connecting said feed mechanism to said wheels, said skid plates being located in front of said wheels and inclining downwardly and rearwardly toward said wheels to a point below said feed mechanism.

(References on following page)

References Cited in the file of this patent

UNITED STATES PATENTS

| | | |
|---|---|---|
| 589,546 | Crownover | Sept. 7, 1897 |
| 616,298 | Dykes | Dec. 20, 1898 |
| 1,712,485 | Tokita | May 14, 1929 |
| 1,957,594 | Helm | May 8, 1934 |
| 1,966,192 | Tiede | July 10, 1934 |
| 2,243,233 | Volk | May 27, 1941 |
| 2,282,625 | Volk | May 12, 1942 |
| 2,323,995 | Hiroshima | July 13, 1943 |
| 2,510,231 | Juzwiak | June 6, 1950 |
| 2,593,696 | Pool | Apr. 22, 1952 |
| 2,612,294 | Dorschner | Sept. 30, 1952 |
| 2,624,492 | Seltzer | Jan. 6, 1953 |